April 30, 1963   J. J. SMITH   3,087,358
DRILLING MACHINE
Filed Oct. 20, 1961   2 Sheets-Sheet 2
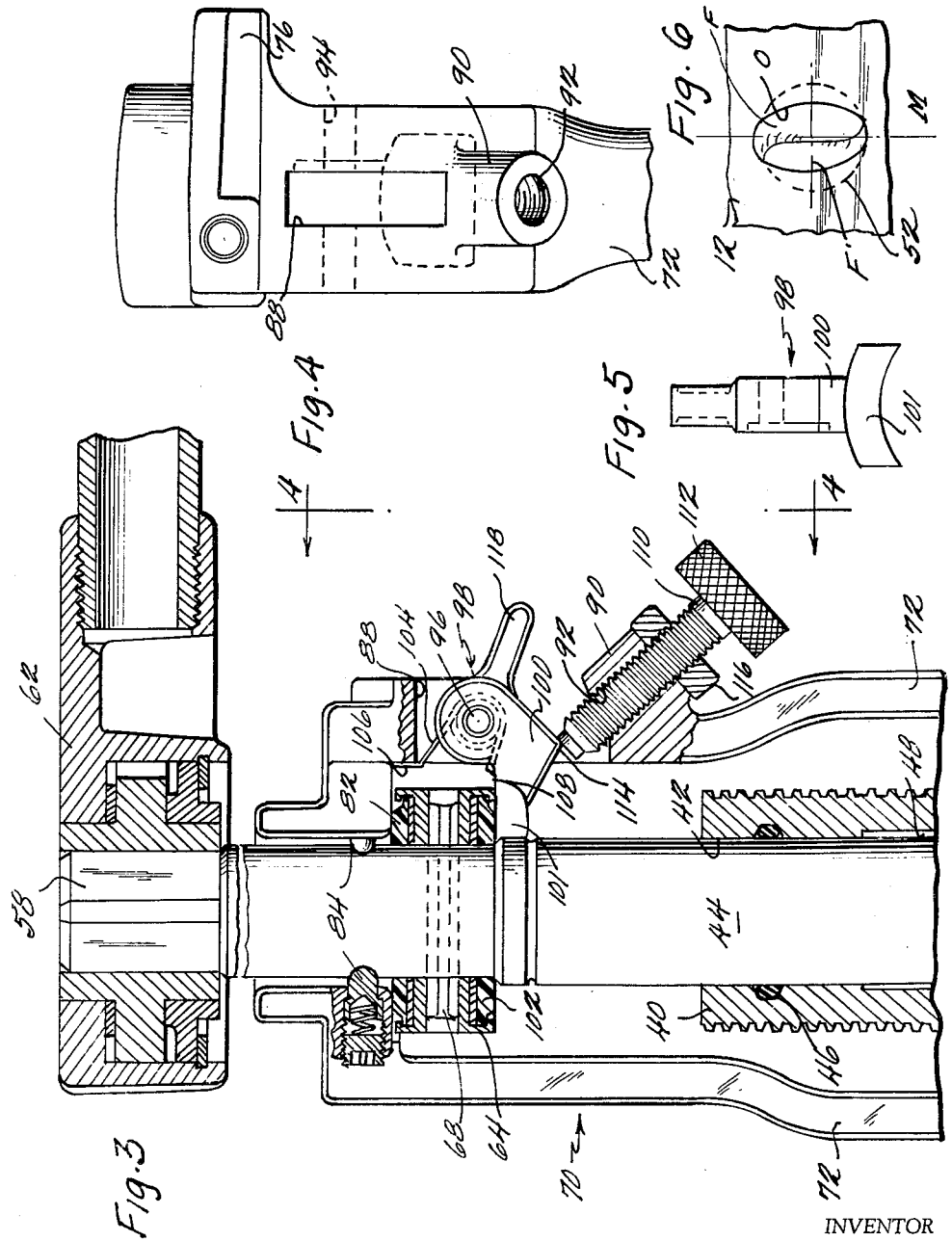
INVENTOR
JOHN J. SMITH
BY Cushman, Darby & Cushman
ATTORNEYS

United States Patent Office 3,087,358
Patented Apr. 30, 1963

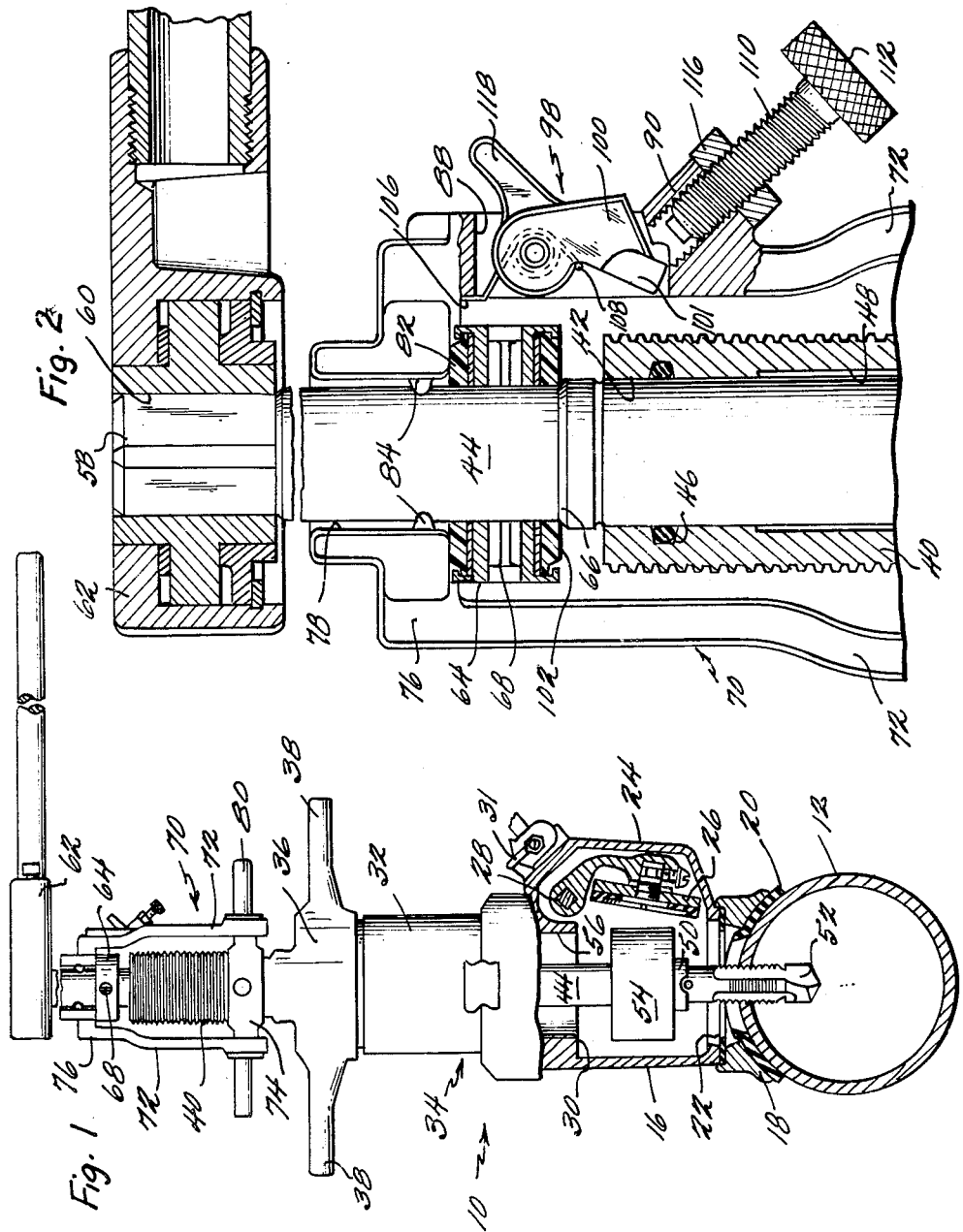

3,087,358
DRILLING MACHINE
John J. Smith, Decatur, Ill., assignor to Mueller Co., Decatur, Ill., a corporation of Illinois
Filed Oct. 20, 1961, Ser. No. 146,562
7 Claims. (Cl. 77—40)

This machine relates to machines for drilling and tapping gas pipe lines and the like, and has particular reference to a new and improved means for controlling the feed of the drill to prevent premature advance and jamming of the drill in the oval-shaped hole at the bottom of the cut which is found inherently on initial penetration to the interior of the pipe.

Pipe drilling machines of this character have gained wide use in the gas industry wherein the gas mains and the like are tapped for one reason or other, e.g. to install a bypass pipe line. Pipe tapping machines of this character generally include a valve body removably seated against the pipe wall as by a chain, the valve body carrying at its opposite end a housing through which is passed a boring bar having a drill bit carried at its lower end. The housing carries a threaded cap sleeve extension through which the boring bar extends. The boring bar carries a thrust collar at its upper end and ratchet drive means or the like are provided to rotate the boring bar to drill the pipe wall. A feed nut and yoke are engaged with the upper side of the thrust collar of the boring bar and are independently rotatable along the cap sleeve to provide the feed of the boring bar during drilling and tapping.

In utilizing a combination drill and tap with a machine of this character for drilling pipes, because of the curvature of a pipe wall, an oval-shaped hole is necessarily created at the bottom of the cut on initial penetration through the pipe by the drilling portion of the tool. During such initial penetration of the interior pipe surface, the low pressure within the pipe and lack of control of the feed portion of the drill end of the tool permits the drill to drop prematurely into the aforedescribed oval-shaped hole prior to actual completion of the cut. This problem arises with conventional twoflute drill ends when the flutes become aligned with the minor axis of the oval-shaped hole. In practice, the drill tip will then bind, and a difficult problem of providing a proper drilling operation is thereby presented with such prior art drilling and tapping machines.

According to this invention, there is provided a drilling and tapping machine of the character described which includes new and improved means for preventing relative axial movement of the boring bar with respect to the cap sleeve extension so that the undesirable tendency of the drill tip to fall through the initially formed oval-shaped hole is effectively obviated. This invention provides a means for locking the boring bar to the feed yoke to provide controlled drill feed, until disconnected upon completion of the drilling operation.

Still further according to this invention, there is provided a drilling and tapping machine of the character described wherein a spring biased locking pawl is pivotally mounted to one of the arms of the feed nut and yoke, which locking pawl is adapted to engage the underside of the thrust collar carried by the upper end of the boring bar. The spring normally maintains the locking pawl within the yoke arm out of the path of travel of the anti-friction collar carried by the boring bar. An operating screw is carried in cooperative relationship with respect to the locking pawl by the yoke arm so as to pivot the locking pawl into engagement with the underside of the anti-friction collar when the operating screw is rotated inwardly.

A further object of this invention is to provide a drilling and tapping machine of the character described which includes means carried by the feed nut and yoke for selective engagement with the anti-friction collar of the boring bar to prevent relative axial movement therebetween.

These and still further objects, advantages and novel features of the present invention will become apparent in the specification and claims, taken in connection with the accompanying drawings.

In the drawings:
FIGURE 1 is an elevational view, partially in vertical section, of the drilling and tapping machine according to the present invention assembled to a pipe line;
FIGURE 2 is an enlarged fragmentary vertical sectional view of the upper end of the machine shown in FIGURE 1;
FIGURE 3 is a view similar to FIGURE 2 but showing the locking pawl engaging the thrust collar;
FIGURE 4 is a fragmentary side view of a feed yoke leg, taken generally along line 4—4 in FIGURE 3;
FIGURE 5 is a plan view of the locking pawl carried by the feed yoke leg; and
FIGURE 6 is a diagrammatic plan view of the pipe wall as viewed from the inside during initial penetration of the drill tip.

Referring now to the accompanying drawings, there is shown in FIGURE 1 a drilling machine 10 secured to a curved wall chamber such as a gas or water main 12 as by an engaging chain or the like (not shown) such as shown and described in the patent to Mueller et al., No. 2,986,958.

The machine 10 includes a lower valve housing 16 having a saddle 18 at its lower end. A suitable gasket 20 is positioned between the saddle 18 and the main 12, and another gasket 22 is carried between the saddle 18 and the housing 16.

The housing 16 is hollow and bulges outwardly at one side thereof to form a lateral enlargement 24 for the reception of a flop valve 26, the latter being shown in FIGURE 1 in its open or inoperative position. The flop valve 26 is carried on a shaft 28 journalled in the walls of the housing 16 and provided with an exterior handle (not shown) to move the valve into or out of engagement with a valve seat 30 in the housing, to either close or open the valve.

A by-pass valve 31, mounted on the flop valve housing 16, is employed to control communication between the portions of the fluid chamber above and below the flop valve seat 30 when the valve 26 is closed, to facilitate both tight engagement of the valve with the seat and subsequent opening of such valve.

The open or upper end of the valve housing 16 is interiorly threaded for engagement of one end of the cylinder 32, which, together with the housing constitutes the barrel 34 of the machine. The upper end of the cylinder 32 is closed by a threaded bonnet 36 that is sealed to the cylinder by any suitable means (not shown). Preferably the bonnet 36 is provided with radial handles 38 to facilitate its attachment and removal to and from the cylinder 32. Projecting upwardly from the top of the bonnet 36 is an exteriorly threaded, cylindrical cap sleeve extension 40 of reduced diameter. The bonnet 36 at its extension 40 has an axial bore 42 which forms a bearing for and through which extends an axially and rotatably movable boring bar 44. Adjacent its ends, the extension 40 is provided with interior circumferential grooves having O-rings 46 therein for sealing engagement with the boring bar 44. Below these O-rings 46, the bore 42 is enlarged as at 48 to provide considerable clearance between the bore and the boring bar 44, and forms an annular chamber into which lubricant can be introduced through a suitable charging opening that is normally closed by a screw plug (not shown). The lower or forward end of the boring bar 44 has an enlarged tool holder 50 secured thereto as by welding for removably carrying a tool, such as a combined drill and tap 52.

Seated against the holder 50 is a cylindrical guide collar 54 of substantial diameter which is adapted for closely fitting engagement with an accurately machined cylindrical interior guide portion 56 in the flop valve housing 16 immediately above the valve seat 30, to maintain the tool 52 centered at the start of a cutting operation. The upper end of the boring bar 44 carries an extending square end portion 58 or of other non-circular configuration for reception in a complementary socket or opening 60 of a ratchet wrench 62 that is used to rotate the boring bar 44. A thrust collar 64 is fitted against a peripheral shoulder 66 on the boring bar 44 and is held in place by a roll pin 68 extending through the bar.

A generally U-shaped yoke 70 has the lower ends of its legs or arms 72 pivotally carried by a feed collar 74, which, in turn, is threadably mounted on the extension 40. The upper base end 76 of the yoke 70 has a generally U-shaped notch 78 therein, so that the yoke may be swung up into the position shown in the drawings wherein the boring bar 44 is received in such notch and the yoke base 76 may bear against the top of the thrust collar 64. In this position, a feeding movement may be imparted to the boring bar 44 on rotation of the feed collar 74, which rotation can be accomplished manually by radial handles 80 thereon. Preferably, the thrust collar 64 carries a "Teflon" coated metal thrust washer 82 at its upper end to reduce friction between the thrust collar 64 and the base 76.

Projecting inwardly from the sides of the notch 78 are spring biased detents 84, best shown in FIGURE 3, which are spaced from the base of the notch 78 at a distance greater than one half the diameter of the boring bar 44. Hence, in the operative position of the yoke 70, the detents 84 engage the bar 44 to retain the yoke 70 in such position.

The structure heretofore described is well-known in the art, being disclosed, e.g., in the patent to Mueller et al. 2,986,958.

According to this invention, there are provided means carried by a leg 72 of the yoke 70 for engaging the underside of the thrust collar 64 to prevent relative axial movement between the boring bar 44 and the yoke 70. To this end, the leg 72 has a generally rectangular recess 88 at the base end 76; and, carried therebelow in alignment with the recess 88 is an extending inclined boss 90 having a threaded bore 92 in communication with the lower end of the recess 88. Conveniently, the boss 90 is integrally formed with the yoke leg 72 as by casting or the like.

The leg 72 also has a transverse passage 94 (in FIGURE 4) in transverse alignment with the rectangular recess 88, carrying therein a pin 96. A locking pawl 98 is rotatably carried on the pin 96, and has an extending leg portion 100 movable from an outward position within the recess 88 for engagement with the underside of the thrust collar 64. In this regard the extremity of the leg 100 terminates in an arcuately curved, downwardly inclined plate portion 101 to provide engagement with the thrust collar 64 over an appreciable area thereof (FIGURE 5). The thrust collar 64 also carries a Teflon coated metal thrust washer 102 along its underside similar in function to the washer 82.

The pawl 98 is biased away from the thrust collar 64 by a pivot arm spring 104 carried by the pin 96. The upper leg 106 of the spring 104 engages the yoke arm 72 adjacent the upper end of the recess 88, while the lower leg 108 is transversely bent at its end to engage the pawl 98, biasing the leg portion 100 in a counterclockwise direction, in FIGURES 2 and 3.

In order to positively urge the leg 100 of the pawl 98 into selective engagement with the underside of the thrust collar 64, an operating screw 110 having a knurled head 112 is carried in the bore 92 of the boss 90.

The screw 110, upon inward rotation, is thereby adapted to counteract the force of the spring 104 and engage a camming surface 114 of the pawl 98, thereby urging the pawl leg 100 into engagement with the underside of the thrust collar 64. Positive positioning thereof is assured by a threaded lock nut 116 carried on the screw 110 for independent engagement with the outer end surface of the inclined boss 90.

Also, the pawl 98 carries an integrally extending pivot arm 118 to facilitate this operation by manual manipulation thereof in a downward direction.

In operation, the machine 10 is initially secured to the pipe main 12, with the yoke 70 pivoted about the feed collar 74 away from the boring bar 44. Conveniently, the screw 110 is in its outer position (FIGURE 2), the pawl 98 being so biased by the spring 104. The boring bar 44 is then axially lowered within the barrel 34 so that the drill 52 is abutting the portion of the pipe main 12 to be drilled. With the boring bar 44 in this position, the yoke 70 is pivoted upwardly so that the U-shaped notch 78 engages the boring bar and is maintained in such a position by the spring biased detents 84. The yoke 70 is then rotated downwardly via the radial handles 80 until the underside of the U-shaped notch 78 abuts the washer 82 carried by the thrust collar 64. The screw 110 is then rotated inwardly, urging the leg 100 of the pawl 98 in engagement with the underside of the thrust collar 64 (FIGURE 3). Manual rotation of the locking nut 116 against the end surface of the collar 90 assures a secure engagement, as is apparent.

The drill 52 is then rotated via the tool holder 50, the boring bar 44 and the ratchet wrench 62. The drill is independently fed, rotating the feed collar 74 of the yoke 70 along the extension 40. Thus, the boring bar 44 is allowed to descend at a predetermined feed rate by engagement of the notched feed yoke base 74 with the upper surface of the thrust collar 64.

In FIGURE 6, after the tip of the drill 52 has initially passed through the wall of the pipe main 12, an oval-shaped hole O is formed therein adjacent the interior pipe surface; and, when the opposed flutes F, F' become aligned with the minor axis M of the oval hole O, the drill 52 will have a tendency to drop, and accordingly bind in the partially drilled aperture. According to this invention, however, this tendency of the tip of the drill 52 to drop into the pipe 12 is fully obviated due to the fact the pawl 98 is in engagement with the underside of the thrust collar 64, which is fixed to the boring bar 44. By virtue of this arrangement, the boring bar 44 is fed independent of the weight thereof, as there is an upward restraining force provided against the underside of the thrust collar 64.

After the drilling portion of the operation is completed, the pawl 98 conveniently is pivoted out of engagement with the thrust collar 64 by rotation of the screw 110, and the yoke 70 is pivotally disengaged from the boring bar 44. The hole is then tapped, this operation, of course, being self-feeding. Subsequent operations, in themselves well-known in the art, may then be performed as, e.g., installation of a service tee in the hole so drilled.

The spring 104 operates to normally bias the pawl 98 away from the thrust collar 64; additionally, the engagement of the pawl 98 with the thrust collar 64 is expedited by simply forcing the pawl in a clockwise direction as shown in the drawings by pressing downwardly on the pivot arm 118 so that the screw 110 is freely rotatable.

From the foregoing description of the various embodiments of this invention, it is evident that the objects of this invention, together with many practical advantages are successfully achieved. While preferred embodiments of my invention have been described, numerous further modifications may be made without departing from the scope of this invention.

Therefore, it is to be understood that all matters herein set forth or shown in the accompanying drawings are to be interpreted in an illustrative, and not in a limiting sense.

What is claimed is:

1. A pipe drilling machine for tapping a pressurized main or the like comprising: a tubular housing having an open end adapted to be received radially to a main; a cap sleeve detachably closing the other end of said housing and having exterior feed threads; a boring bar extending through said sleeve and housing; a thrust collar fixed to said boring bar exteriorly of said cap sleeve; a feed nut in threaded engagement with said cap sleeve threads; a feed yoke pivotally carried by said nut and having a notched base portion adapted for removable engagement with said thrust collar to urge said bar inwardly toward the pipe on rotation of said nut; and means carried by said feed yoke for removable engagement with said boring bar to selectively prevent inward longitudinal movement of said boring bar relative to said yoke when said tubular housing is under pressure.

2. A pipe drilling machine defined in claim 1 wherein said last-mentioned engaging means is adapted for cooperative engagement with the underside of said thrust collar.

3. A pipe drilling machine defined in claim 2 including an anti-friction washer carried adjacent the underside of said thrust collar.

4. A pipe drilling machine defined in claim 2 wherein said last-mentioned engaging means includes a locking pawl pivotally carried by said yoke; means biasing said pawl away from said thrust collar; and means for selectively urging said pawl upwardly in engagement with said thrust collar.

5. A pipe drilling machine defined in claim 4 wherein said pawl urging means includes a screw mounted in inclined relationship to the axis of said boring bar and below the pivot axis of said pawl.

6. A pipe drilling machine defined in claim 4 wherein said biasing means includes a spring.

7. A pipe drilling machine comprising: a tubular housing having an open end adapted to be secured radially to a main; a cap sleeve detachably closing the other end of said housing and having exterior threads; a boring bar extending through said sleeve and housing; a thrust collar fixed to said boring bar exteriorly of said cap sleeve; a feed nut in threaded engagement with said cap sleeve threads; a feed yoke having yoke legs pivotally carried by said feed nut, and a notched base portion of generally U-shaped configuration joined to said legs and adapted for removable engagement with the upper side of said thrust collar; and means carried by one of the legs of said feed yoke for removable engagement with the underside of said thrust collar to selectively prevent inward longitudinal movement of said boring bar relative to said yoke, including a locking pawl having an extending collar engaging leg pivotally carried by said yoke leg, spring means normally biasing said pawl away from said thrust collar, and a screw carried by said leg for selective engagement with said pawl to urge and maintain the latter in engagement with the underside of said thrust collar.

References Cited in the file of this patent

UNITED STATES PATENTS 2,986,958     Mueller et al. _____ June 6, 1961

FOREIGN PATENTS 41,078     Netherlands _____ July 15, 1937